(12) United States Patent
Ito et al.

(10) Patent No.: US 8,090,990 B2
(45) Date of Patent: Jan. 3, 2012

(54) ABNORMAL PATTERN DETECTION PROGRAM FOR FUNCTION CALL IN SOURCE PROGRAM

(75) Inventors: Masako Ito, Kawasaki (JP); Naoki Gunji, Kawasaki (JP); Takahiro Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1328 days.

(21) Appl. No.: 11/643,217

(22) Filed: Dec. 21, 2006

(65) Prior Publication Data

US 2007/0217679 A1     Sep. 20, 2007

(30) Foreign Application Priority Data

Mar. 17, 2006   (JP) .................................. 2006-074409

(51) Int. Cl.
 *G06F 11/00* (2006.01)
(52) U.S. Cl. .............................. 714/38.1; 714/2; 714/48
(58) Field of Classification Search ................ 714/1, 38, 714/48, 38.11, 492, 38.1
See application file for complete search history.

(56) References Cited

U.S. PATENT DOCUMENTS

| 6,504,930 B2 * | 1/2003 | Enari .............................. 380/37 |
| 7,496,898 B1 * | 2/2009 | Vu ................................. 717/127 |
| 2003/0154426 A1 * | 8/2003 | Chow et al. .................... 714/30 |

FOREIGN PATENT DOCUMENTS

| JP | 11-134188 | 5/1999 |
| JP | 2005-004301 | 1/2005 |

* cited by examiner

*Primary Examiner* — Scott Baderman
*Assistant Examiner* — Sarai Butler
(74) *Attorney, Agent, or Firm* — Greer, Burns & Crain, Ltd.

(57) ABSTRACT

Disclosed is an abnormal pattern detection program for a function call in a source program that makes a computer, which is connected to a main memory and an output device, execute the following processes.
(1) A reading process for reading the source program onto the main memory.
(2) A sentence extracting process for extracting previous and next sentences of every function call of each function from the source program read onto the main memory.
(3) A setting process for setting common appearance patterns, which are included in the previous and next sentences of every function call extracted through the sentence extracting process and appear in a high frequency, on the main memory.
(4) An output process for outputting a warning message from the output device when a function call whose previous and next sentences do not include any of the common appearance patterns is found in the source program.

Figure 1:
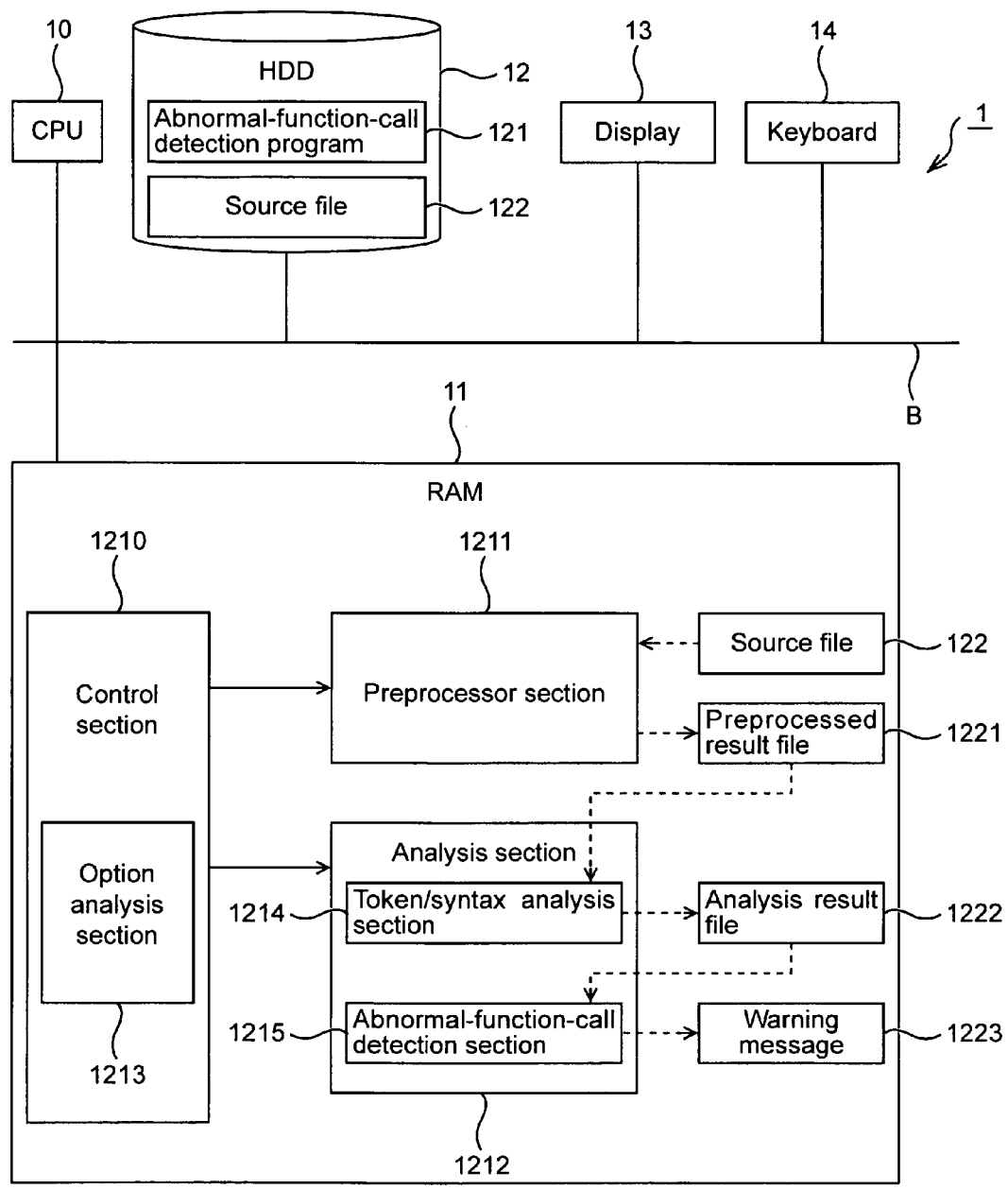

6 Claims, 2 Drawing Sheets

ABNORMAL PATTERN DETECTION PROGRAM FOR FUNCTION CALL IN SOURCE PROGRAM

BACKGROUND OF THE INVENTION

The present invention relates to an abnormal pattern detection program for a function call in a source program that is used to detect a description error of a function call portion described in a source program.

A function call portion in a source program must be described according to a predetermined convention. That's because a description error in a function call sentence causes a fault and a description error in a previous or next sentence of the function call sentence causes a fault owing to a pre process mistake or a post process mistake.

Therefore, methods for detecting a description error in a function call portion in a source program are previously known. One of the methods is "human review" that checks a function call portion by a manual human operation. Another of the methods is "program review" that automatically checks a function call portion by a tool program. JP2005-4301A and JP11-1341882A disclose conventional check methods.

However, the "human review" tends to omit checking an description error, and the quality of its check result is dependent on the skill of the reviewer.

The "program review" requires preparing a tool for checking items of every target function. Namely, a person who does the "program review" must determine checking items such as an item for checking whether a function call description satisfies predetermined conditions (for example, when "A function" must be paired with "B function", whether both "A function" and "B function" are described) and an item for checking whether a function returns a predetermined value when a predetermined argument is passed to the function. And then, the person who does the "program review" must prepare a tool for the checking items. Therefore, the conventional "program review" can check only functions for which the tool is prepared. It is difficult to prepare a tool for checking items of all the functions as a matter of fact because of limitations of cost and time.

SUMMARY OF THE INVENTION

The present invention aims to overcome the problems of the conventional checking method for a function call portion. An object of the present invention is to provide an abnormal pattern detection program that can automatically detect a description error in every function call portion in a source program without preparing a tool for checking items of target functions.

A first aspect of the abnormal pattern detection program for a function call in a source program according to the present invention makes a computer, which is connected to a main memory and an output device, execute the following processes in order to detect a description error in previous and next sentences of each function call in a source program.
(1) A reading process for reading the source program onto the main memory.
(2) A sentence extracting process for extracting previous and next sentences of every function call of each function from the source program read onto the main memory.
(3) A setting process for setting common appearance patterns on the main memory. Character-string patterns that are included in the previous and next sentences of every function call extracted through the sentence extracting process and appear in a high frequency are defined as the common appearance patterns.
(4) An output process for outputting a warning message from the output device when a function call whose previous and next sentences do not include any of the common appearance patterns set in the setting process is found in the source program read onto the main memory.

When a computer reads and executes the above-described abnormal pattern detection program for a function call in a source program, the computer reads the source program of a process target onto the main memory (the reading process). Then, the computer extracts previous and next sentences of every function call of each function from the source program read onto the main memory (the sentence extracting process). Next, the computer specifies the character strings that appear in a high appearance frequency as the common appearance patterns about each of the previous and next sentences extracted (the setting process). And then, the computer outputs the warning message from the output device when a function call whose previous and next sentences do not include any of the common appearance patterns is found in the source program (the output process).

With this program, since a function call to which the warning message is not output includes a character string pattern that is regularly used in the previous and next sentences of the same function call at other portions thereof, there is a high probability that the function call is correctly described according to the predetermined convention. However, since a function call to which the warning message is output does not include a character string pattern that is regularly used in the previous and next sentences of same function call at other portions thereof, there is a high probability that the function call is not correctly described according to the predetermined convention. Then, an operator who received this warning message can check the description of the previous and next sentences of the function call to which the warning message was output in the source program.

A second aspect of the abnormal pattern detection program for a function call in a source program according to the present invention makes a computer, which is connected to a main memory and an output device, execute the following processes in order to detect a description error in previous and next sentences of each function call in a source program.
(1) A reading process for reading the source program onto the main memory.
(2) A sentence extracting process for extracting previous and next sentences of the every function call of each function from the source program read onto the main memory.
(3') A pattern extracting process for extracting character-string patterns that are commonly included in the previous and next sentences of a plurality of function calls extracted through the sentence extracting process.
(4') A calculating process for calculating appearance frequencies of the character-string patterns extracted through the pattern extracting process.
(5) A setting process for setting common appearance patterns on the main memory. The character-string patterns whose appearance frequencies calculated through the calculating process are higher than a predetermined threshold value are defined as the common appearance patterns.
(6) A search process for searching the source program read onto the main memory for a function call whose previous and next sentences do not include any of the common appearance patterns set through the setting process.
(7) An output process for outputting a warning message from the output device when a function call whose previous and next sentences do not include any of the common appearance patterns is searched through the search process.

When a computer reads and executes the above-described abnormal pattern detection program for a function call in a source program, the computer reads the source program of a process target onto the main memory (the reading process). Then, the computer extracts previous and next sentences of every function call of each function from the source program read onto the main memory (the sentence extracting process). And then, the computer extracts character-string patterns that are commonly included in the previous and next sentences of a plurality of function calls extracted through the sentence extracting process (the pattern extracting process). Next, the computer calculates appearance frequencies of the character-string patterns extracted (the calculating process), and specifies the character-string patterns whose appearance frequencies are higher than the predetermined threshold value as common appearance patterns (the setting process). Then, the computer searches the source program for a function call whose previous and next sentences do not include any of the common appearance patterns (the search process), and outputs the warning message from the output device when the a function call whose previous and next sentences do not include any of the common appearance patterns is searched (the output process).

With this program, since a function call to which the warning message is not output includes a character string pattern that is regularly used in the previous and next sentences of the same function call at other portions, there is a high probability that the function call is correctly described according to the predetermined convention. However, since a function call to which the warning message is output does not include a character string pattern that is regularly used in the previous and next sentences of the same function call at other portions thereof, there is a high probability that the function call is not correctly described according to the predetermined convention. Then, an operator who received this warning message can check the description of the previous and next sentences of the function call to which the warning message was output in the source program.

According to the present invention constituted as mentioned above, a description error in a function call portion can be automatically detected for every function without preparing tool programs for checking items of target functions.

DESCRIPTION OF THE ACCOMPANYING DRAWINGS

Figure 2:
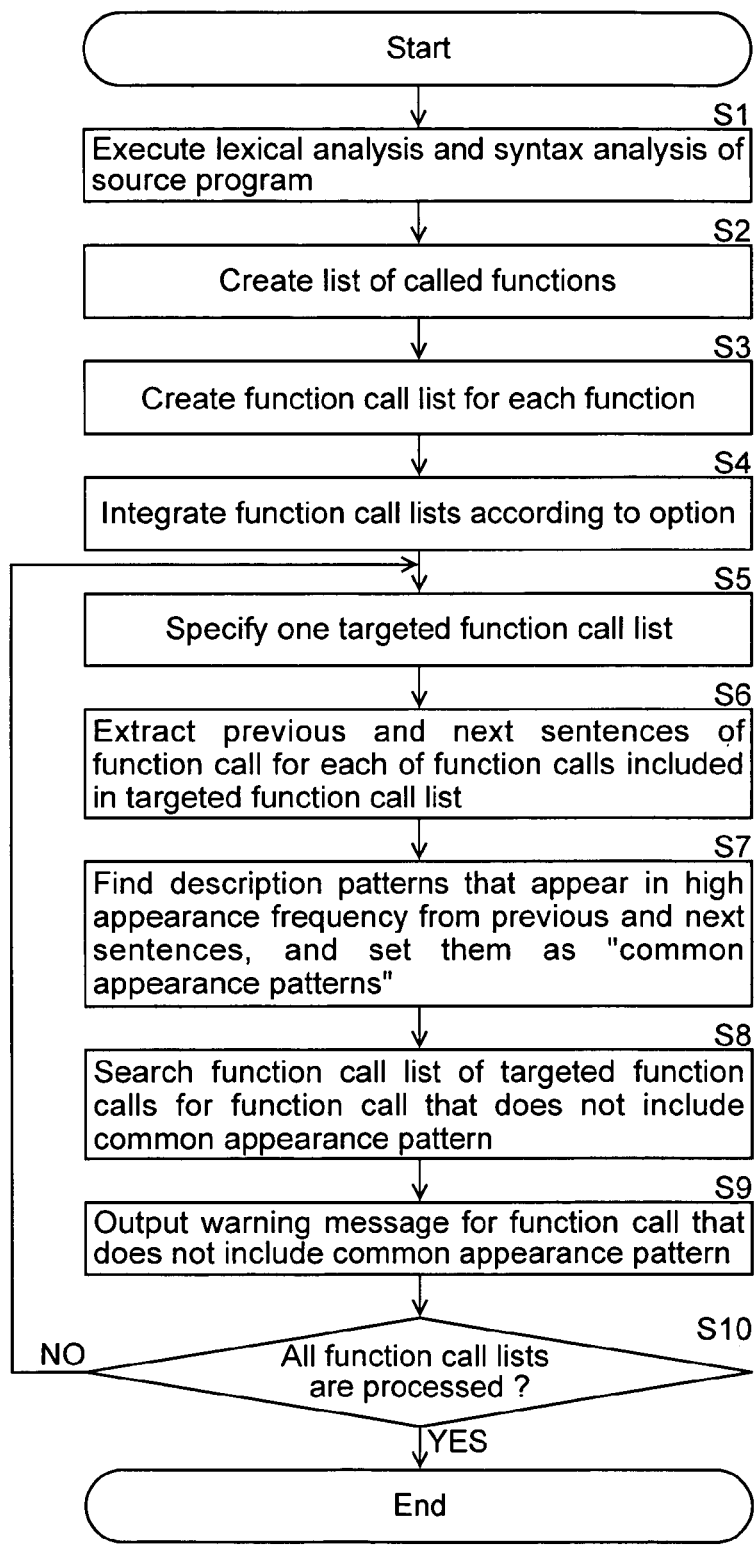

FIG. 1 is a block diagram showing an outline configuration of a computer into which an abnormal pattern detection program for a function call is installed, and FIG. 2 is a flowchart showing contents of the process executed by a CPU according to an analysis section in the abnormal pattern detection program for a function call.

DESCRIPTION OF THE PREFERRED EMBODIMENTS

Hereafter, an embodiment of the present invention will be described with reference to drawings.
<System Configuration>
FIG. 1 is a block diagram showing an outline configuration (a hardware configuration and a program configuration) of a computer into which the abnormal pattern detection program for a function call (it is referred to as an abnormal-function-call detection program) according to the embodiment of the present invention is installed. As shown in FIG. 1, the computer has a CPU 10, a RAM 11, a hard disk 12, a display 13, and a keyboard 14 as main components. These components are mutually connected by a bus B.

The CPU 10 is a central processing unit to execute predetermined processes by reading and executing programs. The CPU 10 corresponds to the computer itself in the claims.

The hard disk 12 is storage that stores various programs, which are executed by the CPU 10, and various data. One of the programs that are stored in the hard disk 12 is the above-mentioned abnormal-function-call detection program 121. The data stored in the hard disk 12 includes a source file 122 that will be a target of the process according to the abnormal-function-call detection program 121.

The RAM 11 is a main memory on which the program read from the hard disk 12 is cached and its workspace is developed, when the CPU 10 executes the above-mentioned process. FIG. 1 shows the condition where the respective modules that constitute the abnormal-function-call detection program 121 are developed onto the workspace of the RAM 11 when the abnormal-function-call detection program 121 is read by the CPU 10. That is, the abnormal-function-call detection program 121 broadly consists of a control section 1210, a preprocessor section 1211, and an analysis section 1212.

The control section 1210 is a module that controls operations of the preprocessor section 1211 and the analysis section 1212. The control section 1210 includes an option analysis section 1213. The option analysis section 1213 analyzes which options will be selected by an operator with respect to an integrated condition of a function call list and a threshold value for determining a pattern with a high appearance frequency, which will be described below, based on contents of options registered in tables or registers (not shown).

The preprocessor section 1211 reads the source file 122 from the hard disk 12, executes preprocesses such as taking-in of an include header and a macro expansion about the source program contained in the source file 122, and outputs a result as a pretreatment result file 1221.

The analysis section 1212 consists of a token/syntax analysis section 1214, and an abnormal-function-call detection section 1215. The token/syntax analysis section 1214 analyzes token and syntax of a source program in a preprocessed result file 1221 to analyze the meaning of the character string described in each line thereof, and outputs an analysis result as an analysis result file 1222. The abnormal-function-call detection section 1215 extracts description patterns whose previous and next sentences of function calls probably include description errors and outputs warning messages 1223 onto the display 13 with respect to the extracted patterns.

The display 13 is an output device onto which the CPU 10 displays a processing result as a screen. The keyboard 14 is an input device by which an operator inputs various commands and data to the CPU 10.
<Process>
Next, the process by the analysis section 1212 (namely, the portion corresponding to the module of the analysis section 1212 among the processes executed by the CPU 10 according to the abnormal-function-call detection program 121) will be described based on the flowchart shown in FIG. 2. When starting this process, as described above, the preprocessor section 1211 has already generated the preprocessed result file 1221 based on the processing target source file 122. The CPU 10 that operates according to the module of the analysis section 1212 (it is simply referred to as the "analysis section 1212" hereafter) executes the process for the preprocessed result file 1221.

In the flowchart of FIG. 2, the analysis section 1212 (the token/syntax analysis section 1214) executes lexical analysis and syntax analysis of the source program, and outputs the results onto the RAM 11 as the analysis result file 1222 in S1 (it corresponds to the reading process).

In the next step S2, the analysis section 1212 (the abnormal-function-call detection section 1215) creates a list of the functions that are currently called. That is, the list of the functions called by the respective function calls included in the analysis result is created on the RAM 11.

In the next step S3, the analysis section 1212 creates lists (function call lists) of the function calls included in the analysis result on the RAM 11 with respect to the respective functions in the function list created in S2.

In the next step S4, the analysis section 1212 integrates the function call lists created in S3 based on the operator's selection analyzed by the option analysis section 1213 of the control section 1210. Specifically, when the operator selects a first option, functions that call the same function are considered as one function, and the analysis section 1212 advances the process to S5. When the operator selects a second option, functions that have the same name are considered as one function even if the functions call different functions, and the analysis section 1212 integrates function call lists that are created for functions having the same function name into one function call list. For example, although the function calls described as follows call different functions, the function names thereof are identical. In such a case, while the selection of the first option does not integrate the function call lists, the selection of the second option integrates both the function call lists.
func(0);
func(0, 1);

When the operator selects a third option, functions that have similar name are considered as one function even if the functions call different functions, and the analysis section 1212 integrates the function call lists that are created for functions having similar function name.

Next, the analysis section 1212 executes a loop process from S5 to S10 in order to extract a description error in a function call portion for each of the function call lists integrated in S4. In a first step S5 of the loop process, the analysis section 1212 specifies one unfinished function call list among the respective function call lists integrated in S4.

In the next step S6, the analysis section 1212 extracts previous and next sentences of a function call for each of the function calls included in the targeted function call list from the analysis result file 1222 acquired in S1 (corresponding to the sentence extracting process).

In the next step S7, the analysis section 1212 finds description patterns that appear in a high appearance frequency from the previous and next sentences of the respective function calls extracted in S6, and sets them as "common appearance patterns". Specifically, the analysis section 1212 extracts a global identifier (an identifier that does not close in a function and can be used in all functions) or a keyword included in the previous and next sentences of each of the function calls extracted in S6 (corresponding to the pattern extracting process). Then, the analysis section 1212 calculates a ratio of the number of appearance of each global identifier and keyword to the total number of appearance of global identifiers and keywords in the previous and next sentences of all the function calls (corresponding to the calculation process). The analysis section 1212 sets the "common appearance patterns" (corresponding to the setting process). The global identifiers and keywords whose ratios (appearance frequencies) are higher than a threshold value are set as the common appearance patterns. The threshold value is selected by an operator from a plurality of options and analyzed by the option analysis section 1213 of the control section 1210.

For example, it is assumed that a process target is a function call list about a function "accept( )". And as shown in the following table 1, it is assumed that the analysis result file 1222 acquired in S1 describes four patterns (patterns 1 through 4) as the information of the function "accept( )".

TABLE 1

Pattern 1
26 void
27 MSGOUT_Error_View :: view( Pointer<< MSGOUT_Error > dt)
28 {
29   dt->accept( this );
30   return;
31 }
Pattern 2
810 void
811 CheckExpNotUpdated_Ex :: visit_to( Pointer< SourceNode >dt )
812 {
813   if( dt != FREE_PTR )
814   {
815     dt->accept( this ); // for void visitors
816   }
817   return;
818 }
Pattern 3
96     if(dt != FREE_PTR && stop_flag == false ){
97       dt->accept( this );
98       return;
99     }
100    else{
101      return;
102    }
Pattern 4
333 void
334 CheckBitOperationOfFloatingPoint::visit_to(Pointer< SourceNode >dt )
335 {
336   if( dt != FREE_PTR )
337   {
338     dt->accept( this ); // for void visitors
339     return;
340   }
341   checker_resutl = false; // for void visitors
342   return;
343 }

In this case, the previous sentences of the function call shown in the following table 2 are extracted from the analysis result shown in the table 1 in S7.

TABLE 2

| Pattern 1 | void MSGOUT_Error_View::view( Pointer< MSGOUT_Error > dt) |
| Pattern 2 | If( dt != FREE_PTR) |
| Pattern 3 | if(dt != FREE_PTR && stop_flag == false ) |
| Pattern 4 | If( dt != FREE_PTR) |

In the same manner, the next sentences of the function call shown in the following table 3 are extracted from the analysis result shown in the table 1.

TABLE 3

| Pattern 1 | return; |
| Pattern 2 | return; |
| Pattern 3 | return; |
| Pattern 4 | return; |

In this case, all the global identifiers and keywords extracted from the previous sentences of the function call shown in the table 2 and their appearance numbers are shown in the following table 4.

TABLE 4

| Occurred global identifier and keyword | Number of occurrence | Ratio(%) |
|---|---|---|
| MSGOUT_Eooro_View | 1 | 10 |
| Pointer | 1 | 10 |
| MSGOUT_Error | 1 | 10 |
| if | 3 | 30 |
| FREE_PTR | 3 | 30 |
| false | 1 | 10 |
| Total number of occurrence | 10 | |

As shown in the table 4, since the total appearance number of all the global identifiers and keywords is "10", the appearance frequency (the ratio) of "MSGOUT_Error_View" whose appearance number is "1" becomes "10%", the appearance frequency (the ratio) of "Pointer" whose appearance number is "1" becomes "10%", the appearance frequency (the ratio) of "MSGOUT_Error" whose appearance number is "1" becomes "10%", the appearance frequency (the ratio) of "if" whose appearance number is "3" becomes "30%", the appearance frequency (the ratio) of "FREE_PTR" whose appearance number is "3" becomes "30%", and the appearance frequency (the ratio) of "false" whose appearance number is "1" becomes "10%". Assuming that the threshold value selected by the operator is "25%", "if" and "FREE_PTR" whose appearance frequencies are "30%" are set as the "common appearance patterns".

Further, the keyword extracted from the next sentences of the function call shown in the table 3 and its appearance number are shown in the following table 5.

TABLE 5

| Occurred global identifier and keyword | Number of occurrence | Ratio(%) |
|---|---|---|
| return | 4 | 100 |
| Total number of occurrence | 4 | |

As shown in the table 5, since the total appearance number of all the global identifiers and keywords is "4", the appearance frequency (the ratio) of "return" whose appearance number is "4" becomes "100%". Assuming that the threshold value selected by the operator is "25%", "return" whose appearance frequency is "100%" is immediately set as the "common appearance pattern".

In the next step S8, the analysis section 1212 searches the function call list of the targeted function calls for a function call whose previous sentence does not include the common appearance patterns about the previous sentence set in S7. In the same manner, the analysis section 1212 searches the function call list of the targeted function calls for a function call whose next sentence does not include the common appearance patterns about the next sentence set in S7 (corresponding to the search process).

In the example of the table 1, the next sentences of the function calls about the function "accept ( )" in all the patterns 1 through 4 include "return" that is the "common appearance pattern" about the next sentence. In contrast, the previous sentence in the pattern 1 includes neither "if" nor "FREE_PRT" that are the "common appearance patterns" about the previous sentence. Therefore, the function call in the pattern 1 is found as a function call that does not have the "common appearance patterns".

In the next step S9, the analysis section 1212 displays the warning messages for the function calls whose previous sentences do not include the "common appearance patterns" about the previous sentence, which are found in S8, onto the display 13. In the same manner, the analysis section 1212 displays the warning messages for the function calls whose next sentences do not include the "common appearance patterns" about the next sentence, which are found in S8, onto the display 13 (corresponding to the output process).

In the example of the table 1, the warning message, which shows that the function call of the pattern 1 does not include the "common appearance pattern", is displayed on the display 13.

In the next step S10, the analysis section 1212 checks whether the process of S5 through S9 has been executed for every function call in the function call list created in S3. When the process of S5 through S9 has been executed for every function call in the function call list, the analysis section 1212 completes the process.

<Operation>

According to the above-mentioned embodiment, the warning message is displayed on the display 13 when a function call whose previous and next sentences do not include any of patterns (common appearance patterns) that are regularly used in previous and next sentences of the same function (or a function having the same name, a function having a similar name) is found in the source program. Therefore, an operator can recognize that the function call to which the warning message was displayed may be described without following the convention, and can verify whether the description of the previous and next sentences of the function call are correctly described according to the convention based on the recognition.

According to the embodiment, when a function call for the same function (or a function having the same name, a function having a similar name) appears at a plurality of times (preferably, equal to or larger than three times) in a source program, a common appearance pattern can be set and a function call portion (a function call, and the previous and next sentences thereof) that may be described without following the convention can be detected. The function call portion can be detected even if the checking items and the combination of the argument and returned value are not defined in the abnormal-function-call detection program (or a table referred by the program).

What is claimed is:

1. A computer readable, non-transitory medium storing an abnormal pattern detection program for a function call in a source program that makes a computer, which is connected to a main memory and an output device, execute the following processes in order to detect a description error in previous and next sentences of each function call in a source program, said processes comprising:
   a reading process to read said source program onto said main memory;
   a sentence extracting process to extract previous and next sentences of every function call of each function from said source program read onto said main memory;
   a setting process to set common appearance patterns, which are included in the previous and next sentences of every function call extracted through said sentence extracting process and appear in a high frequency, on said main memory; and an output process to output a warning message from said output device when a function call whose previous and next sentences do not include any of said common appearance patterns set in said setting process is found in said source program read onto said main memory.

2. A computer readable, non-transitory medium storing an abnormal pattern detection program for a function call in a source program that makes a computer, which is connected to a main memory and an output device, execute the following processes in order to detect a description error in previous and next sentences of each function call in a source program, said processes comprising:

a reading process to read said source program onto said main memory;

a sentence extracting process to extract previous and next sentences of every function call of each function from said source program read onto said main memory;

a pattern extracting process to extract character-string patterns that are commonly included in the previous and next sentences of a plurality of function calls from the previous and next sentences extracted through said sentence extracting process;

a calculating process to calculate appearance frequencies of said character-string patterns extracted through said pattern extracting process;

a setting process to set common appearance patterns on said main memory, wherein character-string patterns whose appearance frequencies calculated through said calculating process are higher than a predetermined threshold value are defined as said common appearance patterns;

a search process to search said source program read onto said main memory for a function call whose previous and next sentences do not include any of said common appearance patterns set through said setting process; and an output process to output a warning message from said output device when a function call whose previous and next sentences do not include any of said common appearance patterns is searched through said search process.

3. The computer readable, non-transitory medium storing the abnormal pattern detection program for a function call in a source program according to claim 2, wherein said pattern extracting process, said calculating process, said setting process, said search process and said output process are executed for each of a previous sentence and a next sentence of a function call.

4. The computer readable, non-transitory medium storing the abnormal pattern detection program for a function call in a source program according to claim 2, wherein function calls are extracted from said source program, function call lists are created on said main memory for each function, and previous and next sentences of function calls included in each of said function call lists are extracted in said sentence extracting process.

5. The computer readable, non-transitory medium storing the abnormal pattern detection program for a function call in a source program according to claim 2, wherein a threshold value selected by an operator is used in said setting process.

6. An abnormal pattern detection method, for a function call in a source program, executed in a computer which is connected to a main memory and an output device, comprising:

reading said source program onto said main memory;

extracting previous and next sentences of every function call of each function from said source program read onto said main memory;

setting common appearance patterns, which are included in the extracted previous and next sentences of every function call and appear in a high frequency, on said main memory; and outputting a warning message from said output device when a function call whose previous and next sentences do not include any of the set common appearance patterns is found in said source program read onto said main memory.

\* \* \* \* \*